United States Patent [19]

Weder

[11] Patent Number: 5,105,599
[45] Date of Patent: Apr. 21, 1992

[54] MEANS FOR SECURING A DECORATIVE COVER ABOUT A FLOWER POT

[75] Inventor: Donald E. Weder, Highland, Ill.

[73] Assignee: Highland Supply Corporation, Highland, Ill.

[21] Appl. No.: 765,416

[22] Filed: Sep. 26, 1991

Related U.S. Application Data

[63] Continuation of Ser. No. 315,169, Feb. 24, 1989, abandoned, which is a continuation of Ser. No. 530,491, May 29, 1990, abandoned.

[51] Int. Cl.⁵ .................. B65B 11/58; B65B 27/00
[52] U.S. Cl. .................................. 53/399; 53/397; 53/449; 53/464; 42/72
[58] Field of Search ............ 53/397, 399, 449, 464, 53/176, 221, 390, 580, 582, 583, 585, 592, 138.1; 97/72; 100/2, 9, 212; 215/12.1; 229/4.5, 187 P

[56] References Cited

U.S. PATENT DOCUMENTS

| Re. 27,744 | 8/1973 | Billett . | |
|---|---|---|---|
| Re. 31,353 | 8/1983 | Cheung . | |
| D. 295,525 | 5/1988 | Sakaki . | |
| 2,133,278 | 10/1938 | Brogden . | |
| 2,236,936 | 4/1941 | Camp . | |
| 2,274,526 | 2/1942 | Bunn . | |
| 2,367,168 | 1/1945 | Cheesman . | |
| 2,514,038 | 7/1950 | Doolittle | 53/414 X |
| 2,882,660 | 4/1959 | Denton . | |
| 2,924,926 | 2/1960 | Paine, Jr. | 53/585 X |
| 3,015,916 | 1/1962 | Denton . | |
| 3,078,631 | 2/1963 | Seserman . | |
| 3,104,937 | 9/1963 | Wyckoff et al. | |
| 3,125,907 | 3/1964 | Derrickson . | |
| 3,126,686 | 3/1964 | Kobylanski . | |
| 3,129,728 | 4/1984 | Sharko . | |
| 3,135,192 | 6/1964 | Derrickson . | |
| 3,152,539 | 10/1964 | Sorensen . | |
| 3,163,899 | 1/1965 | Karass . | |
| 3,164,372 | 1/1965 | Derrickson . | |
| 3,186,333 | 6/1965 | Hoffman et al. | |

(List continued on next page.)

OTHER PUBLICATIONS

EX. A—Brochure, Rubber Band Technology, Bandmaster 102 Model AF, no date.
EX. B—Brochure, Rubber Band Technology, Bandmaster 102 Model ET, no date.
EX. C—Strapack, Inc., Model Sivaron S-661 & 661Y, CPYR, 1984.
EX. D—Brochure, Strapack Semiautomatic Strapping Machine S-660, CPYR 1988.
EX. E—Brochure, Uni-Pac Portable Strapping Kit, no date.
EX. F—Brochure, Cyklop EM-15, two pages, CPYR 1987.
EX. G—Brochure, How to Strap Without Getting in a Bind, two pages, no date.
EX. H—Brochure, Cykop Strapping Corp., ASM Series, two pages, CPYR 1988.
EX. I—Brochure, Strapack Semi-Automatic Strapping Machine, Sivaron S-662.
EX. J—Strapack Semi-Automatic Polypropylene Strapping Machine, Sivaron SS-40.
EX. K—Strapack Semi-Automatic Strapping Machines, Sivaron S-661, S-66IL.
EX. L—Universal Strapping Semi-Automatic Plastic Strapping Machine, two pages.
EX. M—Universal Strapping Extruders of Plastic Strapping, 8 pages, no date.
EX. N—Brochure, Malow Corporation, Heavy Duty Tyer, two pages, no date.

*Primary Examiner*—John Sipos
*Attorney, Agent, or Firm*—Dunlap, Codding & Lee

[57] ABSTRACT

A method for wrapping a flower pot using an upper cover forming device and a lower banding device. The wrapper sheet is placed on the upper supporting surface of the cover forming device, the flower pot is pushed into the opening of the forming device which then forms the wrapper sheet around the flower pot while leaving the upper opening of the pot uncovered and while the wrapper is held in place by the forming device the pot is further pushed down into the banding device where a band is applied around the pot to hold the wrapper in place.

3 Claims, 2 Drawing Sheets

U.S. PATENT DOCUMENTS

| | | |
|---|---|---|
| 3,189,060 | 6/1965 | Attas . |
| 3,192,584 | 7/1965 | Pape . |
| 3,204,312 | 9/1965 | Derrickson et al. . |
| 3,224,363 | 12/1965 | Talbot . |
| 3,251,295 | 5/1966 | Dickens . |
| 3,258,221 | 6/1966 | Derrickson et al. . |
| 3,263,599 | 8/1966 | Dickens . |
| 3,264,022 | 8/1966 | Talbot . |
| 3,279,354 | 10/1966 | Dickens . |
| 3,316,687 | 5/1967 | Bartlett, Jr. . |
| 3,318,230 | 5/1967 | Hilton . |
| 3,324,217 | 6/1967 | Armstrong et al. . |
| 3,368,323 | 2/1968 | Wood . |
| 3,393,633 | 7/1968 | Hoffman et al. . |
| 3,431,706 | 3/1969 | Stuck ............ 53/390 |
| 3,531,910 | 10/1970 | Snead ............ 53/221 X |
| 3,545,723 | 12/1970 | Raley . |
| 3,554,846 | 1/1971 | Billett . |
| 3,612,480 | 10/1971 | Guy . |
| 3,612,481 | 10/1971 | Guy . |
| 3,636,861 | 1/1971 | Weller . |
| 3,639,530 | 2/1972 | Ryan . |
| 3,662,790 | 5/1972 | Styner . |
| 3,691,939 | 9/1972 | Goodley . |
| 3,709,758 | 1/1973 | Gilmore . |
| 3,750,239 | 8/1973 | Styner . |
| 3,759,169 | 9/1973 | Goodley . |
| 3,783,079 | 1/1974 | Wehr . |
| 3,799,835 | 3/1974 | Gilmore . |
| 3,826,443 | 7/1974 | Goodley . |
| 3,841,213 | 10/1974 | Goodley . |
| 3,847,071 | 11/1974 | Goodley . |
| 3,851,683 | 12/1974 | Glaus . |
| 3,873,387 | 3/1975 | Schoening . |
| 3,896,525 | 7/1975 | Stewart, Jr. . |
| 3,949,662 | 4/1976 | Woomer . |
| 3,963,191 | 6/1976 | Goodley . |
| 3,974,762 | 8/1976 | Kita et al. ............ 53/585 X |
| 3,984,278 | 10/1976 | Styner . |
| 3,995,409 | 12/1976 | Discavage et al. . |
| 4,005,647 | 2/1977 | Goodley . |
| 4,020,756 | 5/1977 | Weiss . |
| 4,020,879 | 5/1977 | Billett et al. . |
| 4,062,918 | 12/1977 | Nakanose . |
| 4,090,008 | 5/1978 | Haley . |
| 4,093,146 | 6/1978 | Haley . |
| 4,096,019 | 6/1978 | Lehmann . |
| 4,101,625 | 7/1978 | Haley . |
| 4,137,788 | 2/1979 | Fischer . |
| 4,152,475 | 5/1979 | Haley . |
| 4,216,620 | 8/1980 | Weder et al. ............ 47/72 |
| 4,220,493 | 9/1980 | Wehr . |
| 4,223,704 | 9/1980 | Glaus . |
| 4,227,949 | 10/1980 | Wehr . |
| 4,252,158 | 2/1981 | McDade . |
| 4,253,227 | 3/1981 | Bullington . |
| 4,254,703 | 3/1981 | Fulton et al. . |
| 4,297,811 | 11/1981 | Weder ............ 47/72 |
| 4,300,312 | 11/1981 | Weder et al. ............ 47/72 |
| 4,300,976 | 11/1981 | Wehr . |
| 4,328,742 | 5/1982 | Discavage . |
| 4,383,881 | 5/1983 | Sakaki . |
| 4,401,020 | 8/1983 | Brux . |
| 4,444,097 | 4/1984 | Wehr et al. . |
| 4,450,032 | 5/1984 | Wehr . |
| 4,454,808 | 6/1984 | Wehr et al. . |
| 4,470,241 | 9/1984 | Parry et al. ............ 53/390 X |
| 4,483,516 | 11/1984 | Wehr . |
| 4,502,911 | 3/1985 | Discavage . |
| 4,533,046 | 8/1985 | Kuhnert . |
| 4,536,248 | 8/1985 | Bullington et al. . |
| 4,554,779 | 11/1985 | Fischer . |
| 4,555,893 | 12/1985 | Nakata et al. ............ 53/390 |
| 4,572,251 | 2/1986 | Drury ............ 53/390 X |
| 4,635,542 | 1/1987 | Sebelist et al. . |
| 4,711,071 | 12/1987 | Kagi . |
| 4,718,219 | 1/1988 | Schmitz . |
| 4,725,009 | 2/1988 | Fahrbach . |
| 4,733,521 | 3/1988 | Weder et al. ............ 53/221 X |
| 4,768,276 | 9/1988 | Harlow . |
| 4,773,182 | 9/1988 | Weder et al. ............ 47/72 |
| 4,835,834 | 6/1989 | Weder ............ 29/525 |

MEANS FOR SECURING A DECORATIVE COVER ABOUT A FLOWER POT

This is a continuation of co-pending application Ser. No. 315,169, filed on Feb. 24, 1989, now abandoned, entitled "MEANS FOR SECURING A DECORATIVE COVER ABOUT A FLOWER POT", which is a continuation of co-pending application U.S. Ser. No. 530,491 filed on May 29, 1990, abandoned, entitled "MEANS FOR SECURING A DECORATIVE COVER ABOUT A FLOWER POT".

FIELD OF THE INVENTION

The present invention relates generally to means for applying a sheet of material generally about the outer peripheral surface of a flower pot utilizing a band applicator.

DESCRIPTION OF THE PREFERRED EMBODIMENT

Figure 1:
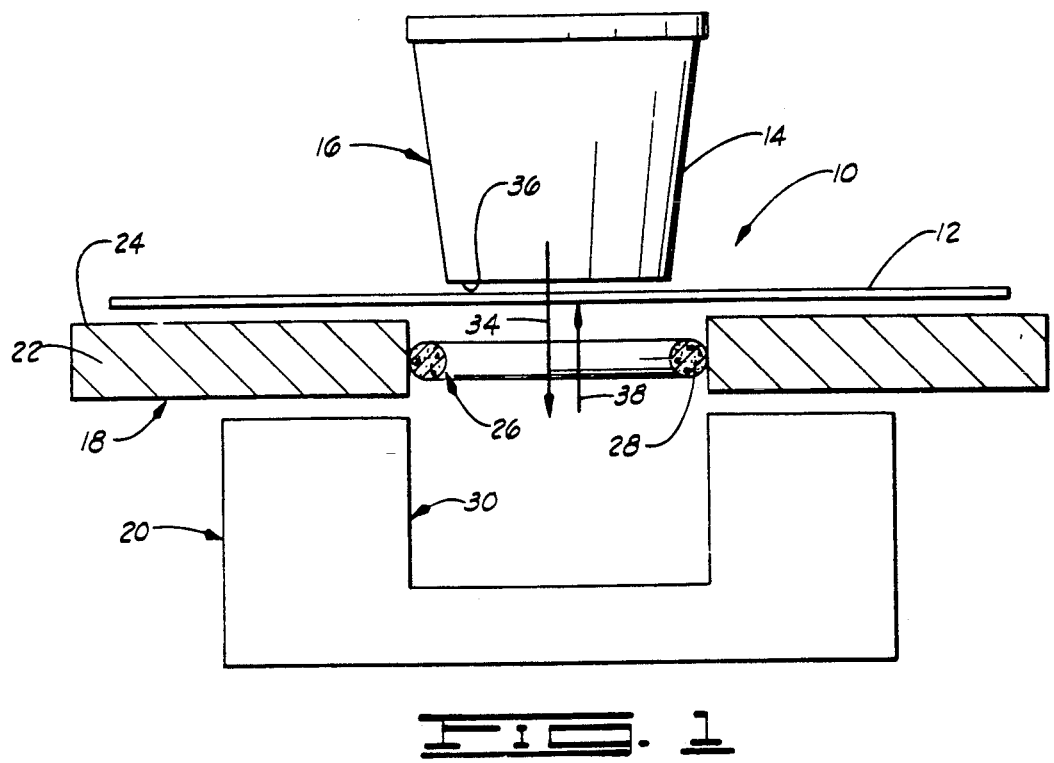
FIG. 1 is a sectional, diagrammatic view illustrating a flower pot generally positioned above a sheet of material and a band applicator in position for applying the sheet of material generally about the outer peripheral surface of the flower pot.
Figure 2:
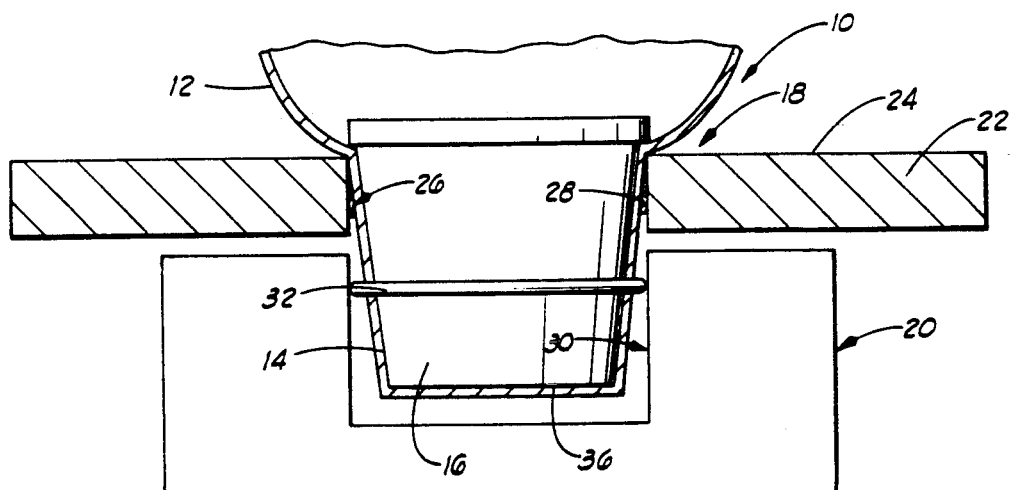
FIG. 2 is similar to FIG. 1 but showing the flower pot moved into the object opening of the band applicator with the sheet of material held in place about the outer peripheral surface of the flower pot by a band.

Shown in FIGS. 1 and 2 and designated therein by the general reference numeral 10 is a system for securing a sheet of material 12 generally about an outer peripheral surface 14 of a flower pot 16 generally for the purpose of providing a decorative cover for the flower pot 16. The system 10 includes a cover forming device 18 and a band applicator 20.

The cover forming device 18 comprises a platform 22 having an upper support surface 24 and a flower pot opening 26 which is formed therethrough and intersects the support surface 24. A generally circularly shaped applicator 28 is supported on the platform 22 and the applicator 28 preferably is constructed of a foam-like material adapted to engage the material and the flower pot without damaging the material or the flower pot. The opening through the applicator 28 forms the flower pot opening 26. A cover forming device which is constructed and operates like the covering forming device 18 is described in detail in U.S. Pat. No. 4,733,521 entitled COVER FORMING APPARATUS, incorporated specifically herein by reference.

The sheet of material 12 may be a shape sustaining material such as a foil for example or a non-shape sustaining cellophane or processed organic polymer film material such as a processed organic polymer film like a polypropylene film for example. The term "processed organic polymer film" as used herein means a manmade resin such as a polypropylene as opposed to naturally occurring resins such as cellophane. A processed organic polymer film is relatively strong and not subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desireable in many applications which is not the case with an untreated paper, for example, unless the paper is treated with a water resistant coating or impregnated with water a resistant material or laminated with such water resistant material. It also should be noted that some papers, such as long fiber papers, are substantially resistant to tearing (substantially nontearable when used as and placed in accordance with the present invention). In addition, a relatively thin film of a substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible, can be made in a sheet-like format for forming into the package 10 of the present invention.

A decorative pattern, such as a solid color and/or an embossed pattern, and/or other decorative surface ornamentation may be applied to the inner surface and/or the outer surface of the container 14.

The flower pot cover 10 may be constructed of a single sheet of material or a plurality of sheets of material. When constructed of a plurality of sheets of material, each sheet of material has a thickness in a range of from less than about 1.0 mil to about 2.5 mils. However, the upper limit on the thickness of each sheet of material could be as high as 20.0 mils depending on the type of material selected. Further, the resulting flower pot cover has a thickness in a range of from less than about 1.0 mils to about 2.5 mils which could be as high as 20.0 mils depending upon the number of sheets of material utilized and the type of materials selected.

The band applicator 20 includes an object opening 30 which is sized to receive a portion of a flower pot. The band applicator 20 is constructed and adapted to substantially automatically apply a band about an object placed within the object opening 30. The term "band" as used herein means any material which may be secured about an object such as the flower pot 16 such as bands commonly referred to as elastic bands or rubber bands and also includes any other type of material such as string or metal or rubber or plastic which may be secured about an object such as the flower pot 16. Band applicators which are constructed to operate like the band applicator 20 described herein are commercially available such as the band applicator available from Rubber Band Technology Limited of Yaykima, Wash. and referred to or identified by their mark "BandMaster". Thus, a detail description of the construction and operation of the band applicator is not deemed necessary herein.

In general, the sheet of material 12 is formed generally about the outer peripheral surface 14 of the flower pot 16 and the flower pot 16 with the sheet of material 12 formed generally about the outer peripheral surface 14 thereof is placed into the object opening 30 of the band applicator 20. After the flower pot 16 with the sheet of material 12 formed thereabout is placed into the object opening 30, the band applicator 20 is accuated to cause a band 32 to be applied about the material and generally about the outer peripheral surface 14 of the flower pot 16. The band 32 cooperates to secure the sheet of material 12 in position disposed generally about the outer peripheral surface 14 of the flower pot 16. After the band 32 has been applied to the outer peripheral surface 14 and about the sheet of material 12, the flower pot 16 with the sheet of material 12 secured thereto by the band 32 is removed from the object opening 30 and the band applicator 20.

The sheet of material 12 is held in place disposed generally about the outer peripheral surface 14 of the flower pot 16 while the flower pot 16 with the sheet of material 12 is disposed in the object opening and during the applying of the band 32 to the flower pot 16. In some applications, the sheet of material 12 may be held by hand formed generally about the outer peripheral surface 14 of the flower pot 16 while the flower pot 16 with the sheet of material held thereabout is disposed in the object opening 30 for applying band 32 thereto.

As shown in FIGS. 1 and 2 and in one preferred form, the cover forming device 18 is used to hold the sheet of material 12 in place generally about the outer peripheral surface 14 of the flower pot 16 during the applying of the band 32. The sheet of material 12 is placed on the upper surface 24 of the platform 22 and positioned so that the sheet of material 12 generally is centered over the flower pot opening 26. The flower pot 16 then is positioned generally above the flower pot opening 26 and above the sheet of material 12. The flower pot 16 then is moved in a downwardly direction 34 to a position wherein a lower end 36 of the flower pot 16 engages a central portion of the sheet of material 12. The flower pot 16 then further is moved in the downward direction 34 thereby pushing the flower pot 16 along with a portion of the sheet of material 12 generally in the downwardly direction 34 and through the flower pot opening 26. The flower pot 16 with the sheet of material 12 formed thereabout further is moved in a downward direction 34 to position the lower end 36 portion of the flower pot 16 generally within the object opening 30 and the band applicator 20. The sheet of material 12 is held position generally about the outer peripheral surface 14 of the flower pot 16 by the applicator 28. In this position, the band applicator 20 is actuated to apply the band 32 generally about the sheet of material and about the outer peripheral surface 14 of the flower pot 16. After the band 32 has been applied about the sheet of material 12 in the flower pot 16, the flower pot 16 then is moved in an upward direction 38 to remove the flower pot 16 from the object opening 30 and the flower pot opening 26. The sheet of material 12 is held in position extending about the flower pot 16 by the band 32.

EMBODIMENT OF FIG. 3

Figure 3:
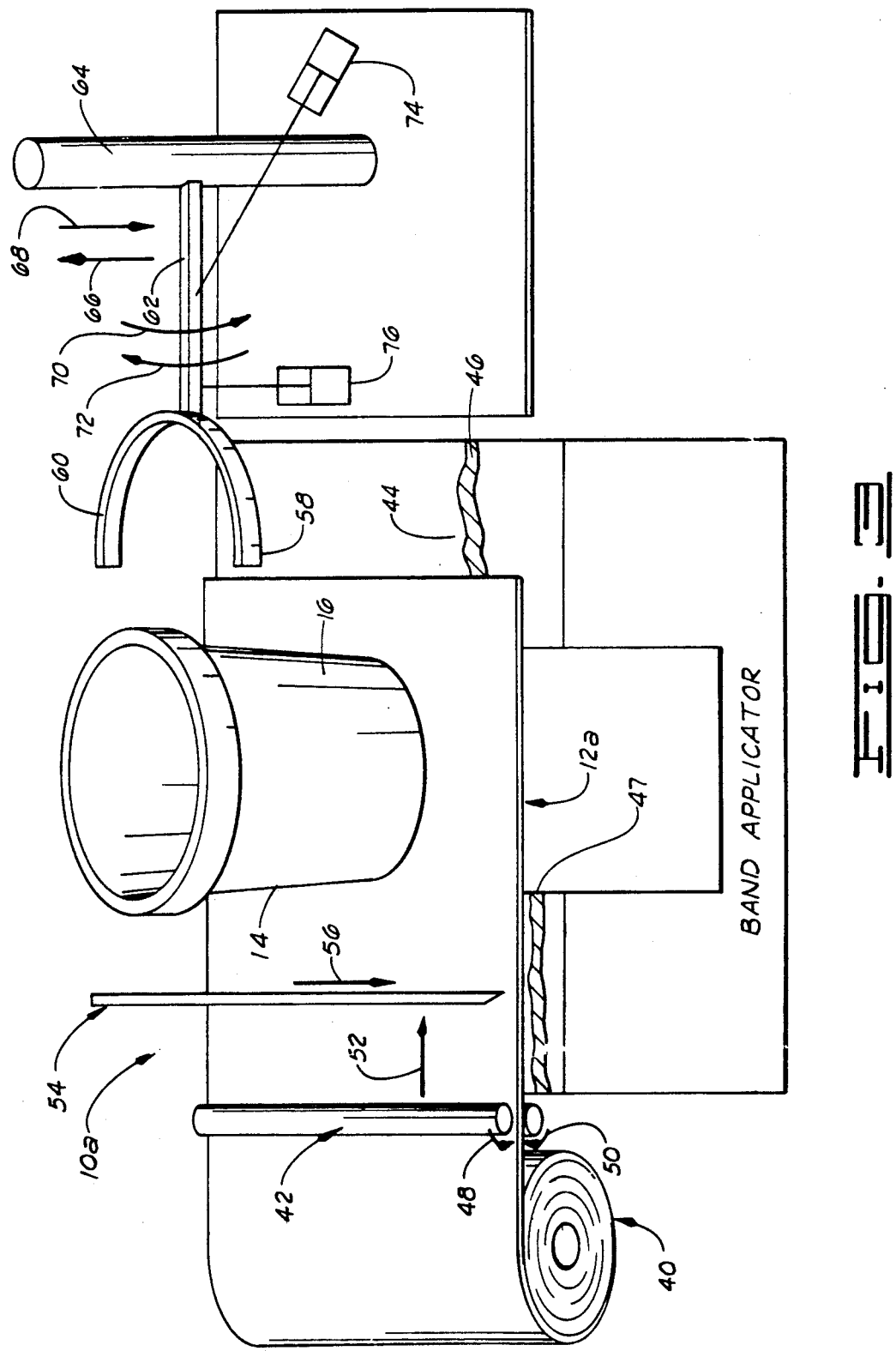
FIG. 3 is a sectional, diagrammatic view showing a system for automatically feeding the material to be applied about the flower pot to the band applicator.

Shown in FIG. 3 is a modified system 10a for securing a sheet of material about the flower pot 16 in a manner like that described before with respect to FIGS. 1 and 2. The system 10a includes a roll of material 40 which is supported so that material may be unrolled from the roll of material 40. The material in the roll of material 40 extends from the roll of material 40 through a pair of rollers 42 and over a portion of an upper surface 44 of a platform 46. The platform 46 includes a flower pot opening 47.

At least one of the rollers 42 is powered so that by rollingly actuating the rollers 42, the rollers 42 are rotated in the respective directions 48 and 50 as indicated in FIG. 3 to move the material in a general direction 52 to a position to wherein a predetermined amount of the material has been disposed generally over the flower pot opening 47 in the platform 46. After a predetermined amount of the material has been unrolled from the roll of material 40 and positioned generally over the flower pot opening 47, a knife 54 is actuated and moved in a downward direction 56 to a position wherein the knife 54 cuttingly engages the material thereby severing a sheet of material 12a from the roll of material 40. The knife 54 is shown in FIG. 3 in the cutting position.

The system 10a also includes a generally U-shaped fork 58 forming an opening 60 which is connected to one end of a bar 62. The opposite end of the bar 62 is movably connected to a post 64 so that the bar 62 may be moved in an upward direction 66 or in a downward direction 68. The bar 62 also is pivotally connected to the post 64 so that the bar 62 may be rotated in a first direction 70 and in a second direction 72.

A first hydraulic cylinder 74 is connected to the bar 62 for moving the bar 62 in the upward or the downward direction 66 or 68. A second hydraulic cylinder 76 is connected to the bar 62 for moving the bar 62 in the direction 70 or 72.

In operation, the flower pot 16 is disposed in the opening 60 and the fork 68 and supported in the fork 68. The bar 62 is moved by the hydraulic cylinder 74 and 76 to position the flower pot 16 generally over the flower pot opening 47 and over the object opening 30 in the band applicator 20. After the sheet of material 12a has been cut from the roll of material 40, the second hydraulic cylinder 76 is actuated to move the bar 62 and the flower pot 16 connected thereto in the downward direction 68 thereby moving the flower pot 16 and the sheet of material 12a through the flower pot opening 47 into the object opening 30 and the band applicator 20. The band applicator 20 then is actuated to apply the band about the sheet of material 12a and generally about the outer peripheral surface 14 of the flower pot 16 thereby securing the sheet of material 12a to the outer peripheral surface 14 of the flower pot in the manner described.

After the band has been applied to the sheet of material 12a and the flower pot 16, the second hydraulic cylinder 76 is actuated to move the bar 62 and the flower pot 16 connected thereto in the upward direction 66 to a position to wherein the flower pot 16 is positioned generally above the flower pot opening 47 generally above the upper surface 44 of the platform 46. The first hydraulic cylinder 74 then is actuated to pivotally move the bar 62 and the flower pot connected thereto in the direction 72 so the flower pot 16 with the sheet of material 12a secured thereto by the band can be removed from the fork 58 and another flower pot can be disposed in the fork 58.

Changes may be made in the construction and operation of the various components and assemblies described herein, and changes may be made in the steps or the sequence of the steps described herein without departing from the spirit and the scope of the invention as defined in the following claims.

What is claimed is:

1. A method utilizing a cover forming device comprising a platform having a flat upper support surface and a flower pot opening which is formed therethrough which intersects the support surface, and an automatic band applicator below said cover forming device with an object opening adapted to substantially automatically apply a band, comprising:

providing a flower pot having an outer peripheral surface and an upper opening;

providing a sheet of material;

disposing the sheet of material upon the flat upper support surface of the platform of the cover forming device and over the flower pot opening therein;

providing a band in said band applicator below the cover forming device;

placing the flower pot over the flower pot opening in the cover forming device;

moving the flower pot downward into engagement with the sheet material and through the flower pot opening in the cover forming device for forming the sheet of material generally about the outer peripheral surface of the flower pot while leaving the opening of the flower pot uncovered and simultaneously holding the sheet of material in place disposed about the outer peripheral surface of the flower pot before the flower pot with the sheet of material is disposed in the object opening in the band applicator and during the automatic applying of the band by the band applicator;

moving the flower pot with the sheet of material formed about the outer peripheral surface thereof downward into the object opening in the band applicator while the sheet of material is held in place disposed about the outer peripheral surface of the flower pot via the cover forming device, and then utilizing the band applicator to automatically apply the band about the sheet of material for securing the sheet of material in position disposed generally about the outer peripheral surface of the flower pot while said cover forming device holds said sheet material wrapped in place around the flower pot and while leaving the opening of the flower pot uncovered; and removing the flower pot with the sheet of material secured thereto by the band from the object opening in the band applicator and from the flower pot opening in the cover forming device.

2. The method of claim 1 wherein the material is a non-shape sustaining material.

3. A method utilizing a cover forming device comprising a platform with a flat upper support surface and a flower pot opening which is formed therethrough which intersects the support surface, and an automatic band applicator below said cover forming device with an object opening adapted to substantially automatically apply a band, comprising:

providing a flower pot having an outer peripheral surface and an opening formed therethrough which intersects the outer peripheral surface;

providing a sheet of material;

disposing the sheet of material upon the flat upper support surface of the platform of the cover forming device and over the flower pot opening therein, wherein the sheet of material supported upon said surface is substantially flat while being supported thereupon;

providing a band in said band applicator below the cover forming device;

placing the flower pot over the flower pot opening in the cover forming device;

moving the flower pot downward into engagement with the substantially flat sheet of material and moving simultaneously the flower pot and the sheet of material downward through the flower pot opening in the cover forming device and forming the sheet of material generally about the outer peripheral surface of the flower pot while permitting the opening of the flower pot to remain open and simultaneously holding the sheet of material in place disposed generally about the outer peripheral surface of the flower pot before the flower pot with the sheet of material is disposed in the object opening in the band applicator and during the automatic applying of the band by the band applicator;

moving the flower pot with the sheet of material formed generally about the outer peripheral surface thereof into the object opening in band applicator and utilizing the band applicator to automatically apply the band about the sheet of material, the band applicator cooperating to secure the sheet of material in position disposed generally about the outer peripheral surface of the flower pot while permitting the opening of the flower pot to remain open, the sheet of material being held in place disposed about the outer peripheral surface of the flower pot via the cover forming device while the band is applied automatically via the band applicator; and removing the flower pot with the sheet of material secured thereto by the band from the object opening in the band applicator and from the flower pot opening in the cover forming device.

* * * * *

UNITED STATES PATENT AND TRADEMARK OFFICE
CERTIFICATE OF CORRECTION

PATENT NO. : 5,105,599
DATED : April 21, 1992
INVENTOR(S) : Donald E. Weder

It is certified that error appears in the above-indentified patent and that said Letters Patent is hereby corrected as shown below:

Cover Sheet, under "Related U.S. Application Data, Section [63]", please delete "Continuation of Ser. No. 315,169, Feb. 24, 1989, abandoned, which is a continuation of Ser. No. 530,491, May 29, 1990, abandoned", and substitute therefore --Continuation of Ser. No. 530,491, May 29, 1990, abandoned, which is a continuation of Ser. No. 315,169, Feb. 24, 1989, abandoned.--

Col. 1, line 5, please delete "This is a continuation of co-pending application Ser. No. 315,169, filed Feb. 24, 1989, now abandoned, entitled "MEANS FOR SECURING A DECORATIVE COVER ABOUT A FLOWER POT", which is a continuation of co-pending application U.S. Ser. No. 530,491 filed on May 29, 1990, abandoned, entitled "MEANS FOR SECURING A DECORATIVE COVER ABOUT A FLOWER POT".", and substitute therefore --This is a continuation of U.S. Ser. No. 530,491, filed on May 29, 1990, abandoned, entitled "MEANS FOR SECURING A DECORATIVE COVER ABOUT A FLOWER POT", which is a continuation of U.S. Ser. No. 315,169, filed on Feb. 24,

UNITED STATES PATENT AND TRADEMARK OFFICE
CERTIFICATE OF CORRECTION

PATENT NO. : 5,105,599
DATED : April 21, 1992
INVENTOR(S) : Donald E. Weder

It is certified that error appears in the above-indentified patent and that said Letters Patent is hereby corrected as shown below:

1989, now abandoned, entitled "MEANS FOR SECURING A DECORATIVE COVER ABOUT A FLOWER POT".--

Signed and Sealed this

Thirteenth Day of May, 1997

Attest:

BRUCE LEHMAN

*Attesting Officer*     *Commissioner of Patents and Trademarks*